(12) United States Patent
Hsu

(10) Patent No.: US 10,868,291 B2
(45) Date of Patent: Dec. 15, 2020

(54) CONDUCTIVE SHEET FOR CONNECTING BATTERIES AND BATTERY CONNECTING MODULE UTILIZING THE SAME

(71) Applicant: MOBILETRON ELECTRONICS CO., LTD., Taichung (TW)

(72) Inventor: Ming-Hung Hsu, Taichung (TW)

(73) Assignee: MDBILETRON ELECTRONICS CO., LTD., Taichung (TW)

( * ) Notice: Subject to any disclaimer, the term of this patent is extended or adjusted under 35 U.S.C. 154(b) by 126 days.

(21) Appl. No.: 15/905,174

(22) Filed: Feb. 26, 2018

(65) Prior Publication Data

US 2019/0198844 A1 Jun. 27, 2019

(30) Foreign Application Priority Data

Dec. 21, 2017 (TW) .............................. 106144962 A

(51) Int. Cl.
*H01M 2/20* (2006.01)
*H01R 4/34* (2006.01)
(Continued)

(52) U.S. Cl.
CPC .............. *H01M 2/206* (2013.01); *H01R 4/34* (2013.01); *H01R 4/58* (2013.01); *H01M 2/0217* (2013.01);
(Continued)

(58) Field of Classification Search
CPC .......... H01M 2/22; H01M 2/206; H01R 4/34; H01R 4/58
See application file for complete search history.

(56) References Cited

U.S. PATENT DOCUMENTS

| 5,418,083 | A | * | 5/1995 | Tamaki | ............... | H01M 2/1083 |
| | | | | | | 429/167 |
| 2006/0177734 | A1 | * | 8/2006 | Yao | ....................... | H01M 2/202 |
| | | | | | | 429/160 |

(Continued)

FOREIGN PATENT DOCUMENTS

| JP | 2006244982 A | 9/2006 |
| JP | 2015022965 A | 2/2015 |

(Continued)

OTHER PUBLICATIONS

European Search Report for EP18213496.5, dated Apr. 12, 2019, Total of 6 pages.

(Continued)

*Primary Examiner* — Maria Laios
(74) *Attorney, Agent, or Firm* — Tracy M Heims; Apex Juris, Pllc.

(57) ABSTRACT

A conductive sheet and a battery conducting module, wherein the battery conducting module is adapted to electrically connect electrodes of a plurality of batteries which are arranged side by side, and includes two conductive sheets. Each of the conductive sheets includes a connecting portion, two first conducting portions, and two second conducting portions. The connecting portion has a first side and a second side. The two first conducting portions are spaced from each other by a distance and are connected to the first side, and extend along a first direction. The two second conducting portions are spaced from each other by a distance and are connected to the second side, and extend along a second direction. The second direction is opposite to the first direction. The conductive sheets are respectively adapted to connect the electrodes of batteries and are disposed facing each other.

11 Claims, 12 Drawing Sheets

(51) Int. Cl.
*H01R 4/58* (2006.01)
*H01M 2/02* (2006.01)
*H01M 2/30* (2006.01)

(52) U.S. Cl.
CPC ........ *H01M 2/307* (2013.01); *H01M 2220/20* (2013.01)

(56) References Cited

U.S. PATENT DOCUMENTS

| | | | |
|---|---|---|---|
| 2009/0297892 A1* | 12/2009 | Ijaz | H01M 2/204 429/7 |
| 2013/0122341 A1 | 5/2013 | De Paoli | |
| 2014/0120407 A1 | 5/2014 | Hofer et al. | |

FOREIGN PATENT DOCUMENTS

| | | | |
|---|---|---|---|
| JP | 2015185295 | A | 10/2015 |
| WO | 2016183086 | A1 | 11/2016 |

OTHER PUBLICATIONS

Office Action for Japanese patent application for 2018-236016, dated Nov. 5, 2019, Total of 3 pages.
English Abstract for JP2006244982, Total of 1 page.
Japanese office action for JP2018-236016, dated Jun. 16, 2020, Total of 2 pages.

* cited by examiner

CONDUCTIVE SHEET FOR CONNECTING BATTERIES AND BATTERY CONNECTING MODULE UTILIZING THE SAME

BACKGROUND OF THE INVENTION

1. Technical Field

The present invention relates generally to a conductive connection structure for batteries, and more particularly to a conductive sheet for connecting batteries and a battery conducting module.

2. Description of Related Art

With the advantages in technology and the concept of environmental protection, the development of electric vehicles has become a trend, and the battery pack portion of the electric vehicle is particularly important. Since the rechargeable battery has technical limitations, a plurality of rechargeable batteries are often connected in parallel to achieve the desired power. Therefore, there is a need for the manufacturers to develop a conductive sheet and a battery conducting module capable of connecting rechargeable batteries, reducing the weight, enabling miniaturization for being received into the space occupied by the rechargeable batteries.

BRIEF SUMMARY OF THE INVENTION

In view of the above, the primary objective of the present invention is to provide a conductive sheet for connecting batteries and a battery conducting module, which could connect multiple battery electrodes.

The present invention provides a conductive sheet, which includes a connecting portion, two first conducting portions, and two second conducting portions. The connecting portion has a first side and a second side, which are opposite to each other. The first conducting portions are spaced from each other by a distance and are connected to the first side of the connecting portion, wherein, both of the two first conducting portions extend along a first direction. The second conducting portions are spaced from each other by a distance and are connected to the second side of the connecting portion, wherein, both of the two second conducting portions extend along a second direction.

In an embodiment, each of the first conducting portions has a first extension section, a first bending section, and a first connecting section; the first extension section is connected to the first side; a side of the first bending section is connected to a side of the first extension section facing the first direction, and another side of the first bending section is connected to the first connecting section; each of the second conducting portions has a second extension section, a second bending section, and a second connecting section, wherein the second extension section is connected to the second side; a side of the second bending section is connected to a side of the second extension section facing the second direction, and another side of the second bending section is connected to the second connecting section.

In an embodiment, the first connecting sections and the second connecting sections are substantially located on the same plane. The connecting portion is located on a plane different from the first connecting sections and the second connecting sections.

In an embodiment, the connecting portion comprises a main portion, a first attached portion, and a second attached portion. The first attached portion and the second attached portion are respectively connected to two ends of the main portion. The first attached portion is substantially parallel to the second attached portion. The first attached portion has the first side, and the second attached portion has the second side.

In an embodiment, each of the first conducting portions has a first bending section and a first connecting section; each of the first bending sections is connected between the first side of the first attached portion and the first connecting section; each of the second conducting portions has a second bending section and a second connecting section; each of the second bending sections is connected between the second side of the second attached portion and the second connecting section.

In an embodiment, the first connecting sections and the second connecting sections are substantially located on the same plane. The connecting portion is located on a plane different from the first connecting sections and the second connecting sections.

The present invention further provides a battery conducting module, which is adapted to connect a plurality of batteries which are arranged side by side, wherein each of the batteries has a first electrode and a second electrode. The first electrodes and the second electrodes of the plurality of batteries are alternatively arranged. The battery conducting module includes two conductive sheets, wherein the two first conducting portions and the two second conducting portions of one of the conductive sheets are adapted to respectively connect the first electrodes of the plurality of batteries, and the two first conducting portions and the two second conducting portions of another conductive sheet are adapted to respectively connect the second electrodes of the plurality of batteries. The connecting portion of each of the conductive sheets has a first surface and a second surface which is opposite to the first surface. The first surface and the second surface are disposed between the first side and the second side. The second surface of the connecting portion of one of the conductive sheets faces the second surface of the connecting portion of another conductive sheet.

In an embodiment, a projection area of the second surface of one of the conductive sheets at least partially overlaps a projection area of the second surface of another conductive sheet in a direction perpendicular to the second surface.

In an embodiment, the two conductive sheets have an interval left therebetween.

In an embodiment, the two first conducting portions of one of the conductive sheets and the two second conducting portions of another conductive sheet are substantially on the same straight line.

In an embodiment, the two first conducting portions of one of the conductive sheets and the two second conducting portions of another conductive sheet are alternately arranged.

In an embodiment, the two first conducting portions and the two second conducting portions of the conductive sheets are substantially located on the same plane.

With the conductive sheet and the battery conducting module, the electrodes of the batteries could be effectively connected. By appropriately disposing the conductive sheets of the battery conducting module, the space occupied by the battery conducting module could be effectively reduced, enabling the miniaturization of the battery conducting module.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
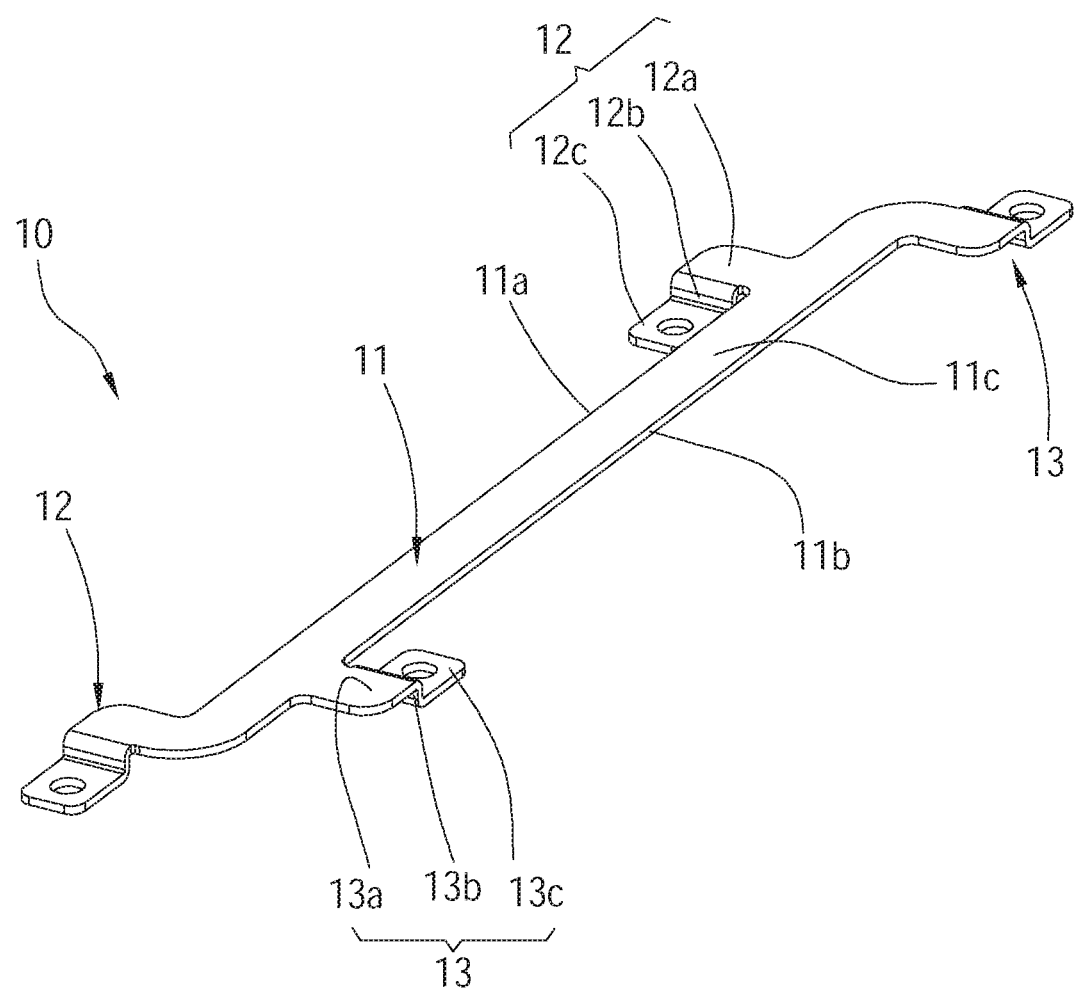
FIG. 1 is a perspective view of the conductive sheet of a first embodiment of the present invention.
Figure 2:
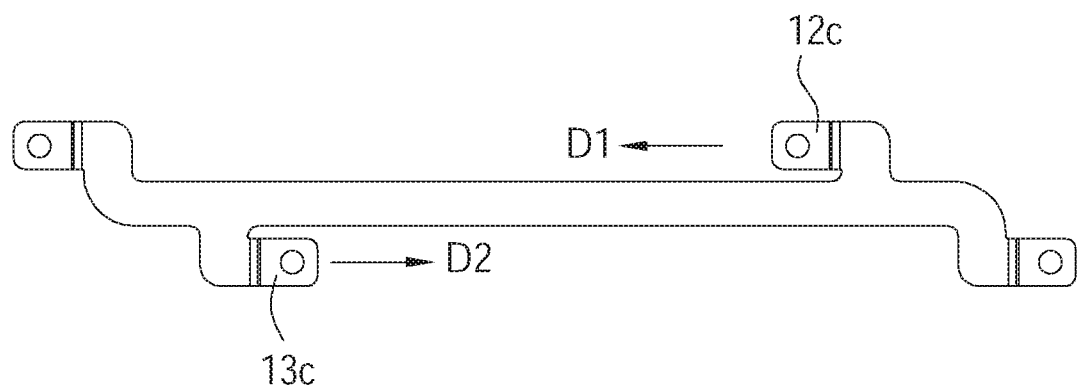
FIG. 2 is a top view of FIG. 1.
Figure 3:
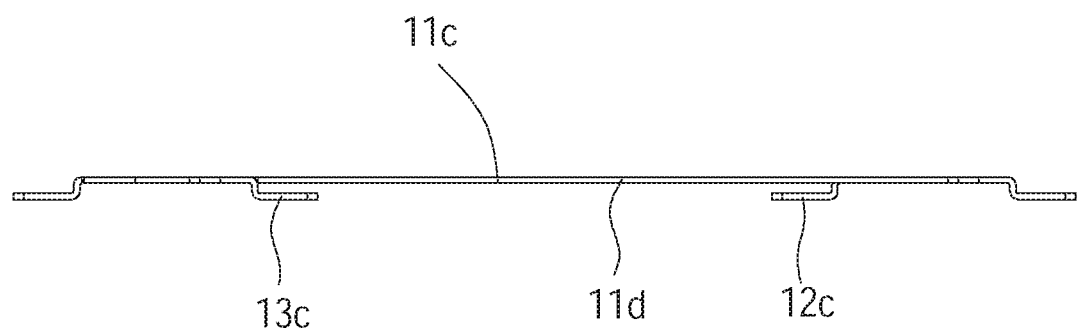
FIG. 3 is a side view of FIG. 1.

A conductive sheet 10 of a first embodiment according to the present invention is illustrated in FIG. 1 to FIG. 3, wherein the conductive sheet 10 is made of conductive material, such as gold, silver, copper, aluminum, etc. In the current embodiment, the conductive sheet 10 is made of copper. However, the material of the conductive sheet is not a limitation of the present invention. The conductive sheet 10 includes a connecting portion 11, two first conducting portions 12, and two second conducting portions 13.

The connecting portion 11 has a first side 11a, a second side 11b, a first surface 11c, and a second surface 11d, wherein the first side 11a is opposite to the second side 11b, and the first surface 11c is opposite to the second surface 11d. The first surface 11c and the second surface 11d are disposed between the first side 11a and the second side 11b.

The two first conducting portions 12 are spaced apart from each other by a distance and are connected to the first side 11a of the connecting portion 11, wherein both of the two first conducting portions 12 extend toward a first direction D1. Each of the first conducting portions 12 has a first extension section 12a, a first bending section 12b, and a first connecting section 12c, wherein the first extension section 12a is connected to the first side 11a; a side of the first bending section 12b is connected to a side of the first extension section 12a which faces the first direction D1, and another side of the first bending section 12b is connected to the first connecting section 12c; the first connecting section 12c extends along the first direction D1. In the current embodiment, the two first extension sections 12a and the connecting portion 11 are substantially located on the same plane. The two first connecting sections 12c are substantially located on the same plane, however, the two first connecting sections 12c and the connecting portion 11 are respectively located on different planes with respect to the connecting portion 11. More specifically, from the perspective of FIG. 1 or FIG. 3, the two first connecting sections 12c are located on a plane which is below the connecting portion 11.

The second conducting portions 13 are spaced apart from each other by a distance and are connected to the second side 11b of the connecting portion 11, wherein both of the two second conducting portions 13 extend toward a second direction D2 which is opposite to the first direction D1. Each of the second conducting portions 13 has a second extension section 13a, a second bending section 13b, and a second connecting section 13c, wherein the second extension section 13a is connected to the second side 11b; a side of the second bending section 13b is connected to a side of the second extension section 13a which faces the second direction D2, and another side of the second bending section 13b is connected to the second connecting section 13c; the second connecting section 13c extends along the second direction D2. In the current embodiment, the two second extension sections 13a and the connecting portion 11 are substantially located on the same plane. The two second connecting sections 13c are substantially located on the same plane, however, the two second connecting sections 13c and the connecting portion 11 are respectively located on different planes with respect to the connecting portion 11. More specifically, from the perspective of FIG. 1 or FIG. 3, the two second connecting sections 13c are located on a plane which is below the connecting portion 11. In addition, the two second connecting sections 13c and the two first connecting sections 12c are substantially located on the same plane.

FIG. 4 to FIG. 7 are schematic diagrams of a battery conducting module 100 of an embodiment, wherein the battery conducting module 100 is disposed on a plurality of batteries 1 which are disposed side by side. Each of the plurality of batteries 1 has a first electrode 2 and a second electrode 3, wherein the first electrodes 2 and the second electrodes 3 of the plurality of batteries 1 are alternately arranged. In the current embodiment, the first electrodes 2 are negative electrodes and the second electrodes 3 are positive electrodes. However, the first electrodes 2 are not limited to be negative electrodes as exemplified above, but could be positive electrodes, and the second electrodes 3 are not limited to be positive electrodes as exemplified above, but could be negative electrodes.

Figure 6:
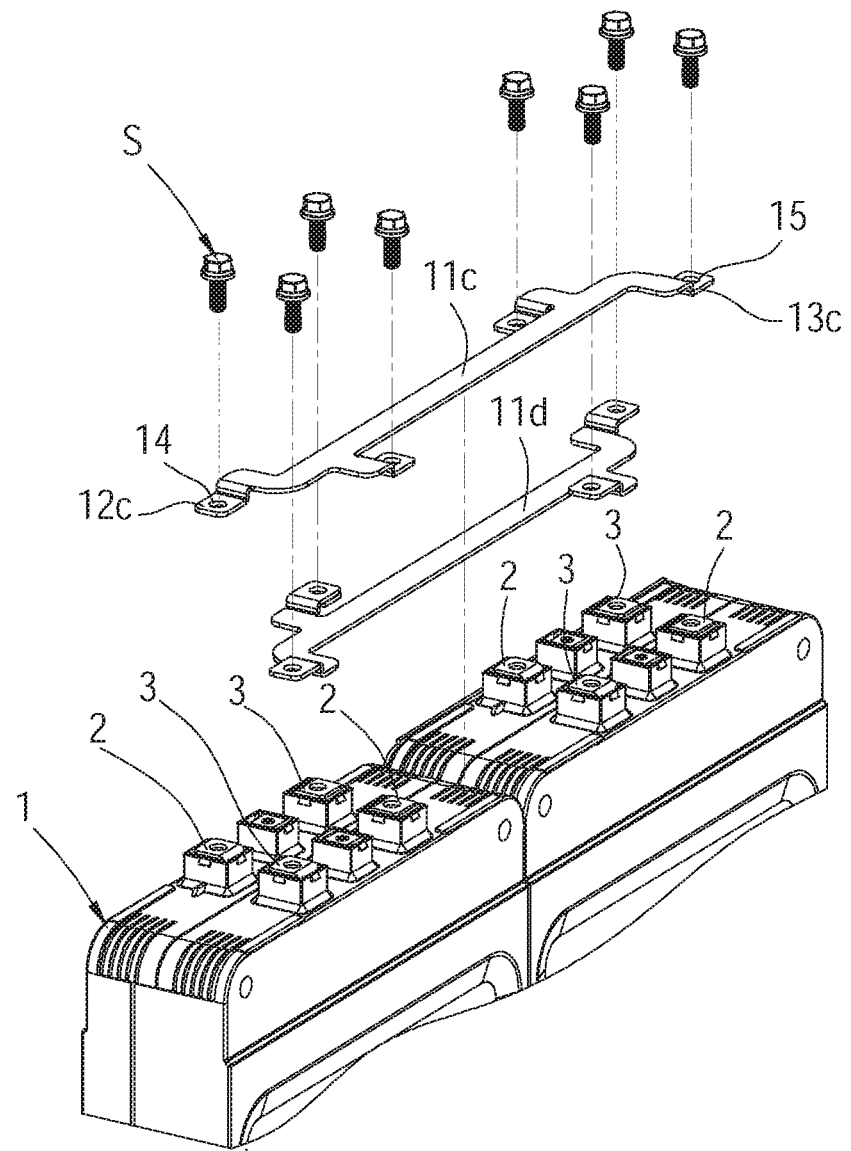
FIG. 6 is an exploded view of FIG. 4.

The battery conducting module 100 includes two conductive sheets 10 of the first embodiment, wherein the two first conducting portions 12 and the two second conducting portions 13 of one of the conductive sheets 10 (e.g. the conductive sheet 10 shown in an upper side of FIG. 6) are adapted to respectively connect the first electrodes 2 of the plurality of batteries 1, and the two first conducting portions 12 and the two second conducting portions 13 of another conductive sheet 10 (e.g. the conductive sheet 10 shown in a lower side of FIG. 6) are adapted to respectively connect the second electrodes 3 of the plurality of batteries 1. As shown in FIG. 6, in the current embodiment, the first connecting section 12c of each of the first conducting portions 12 of the two conductive sheets 10 respectively has a perforation 14, and the second connecting section 13c of each of the second conducting portions 13 of the two conductive sheets 10 respectively has a perforation 15, wherein the perforations 14, 15 are respectively adapted to be passed through by a bolt S, and each of the bolts S is screwed into the first electrodes 2 or the second electrodes 3 of the corresponding battery 1. In this way, the conductive sheets 10 could be firmly and electrically connected to the corresponding first electrodes 2 or the corresponding second electrodes 3. However, in other embodiments, the electrically connecting means between the conductive sheets and the electrodes of the batteries is not limited by the aforementioned design.

Figure 7:
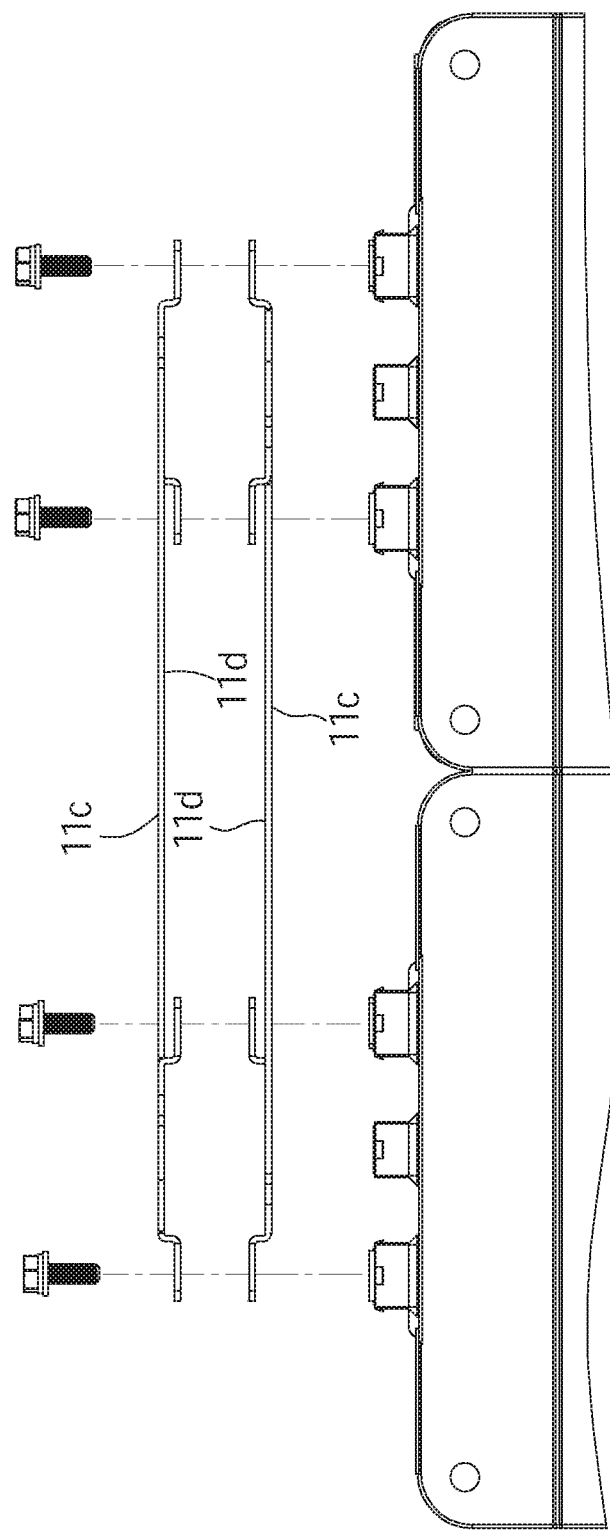
FIG. 7 is a side view of FIG. 6.

It is worth mentioning that, as shown in FIG. 7, when the conductive sheets 10 are disposed on the plurality of batteries 1, the second surface 11d of the connecting portion 11 of one of the conductive sheets 10 faces the second surface 11d of the connecting portion 11 of another conductive sheet 10. Preferably, the two conductive sheets 10 have an interval left therebetween, without contacting with each other, whereby to be electrically insulated from each other. In addition, in order to prevent a short circuit between the two conductive sheets 10, the connecting portion 11 of each of the conductive sheets 10 could be covered or coated with an insulating coating. However, the insulating coating is not a limitation of the present invention.

Figure 5:
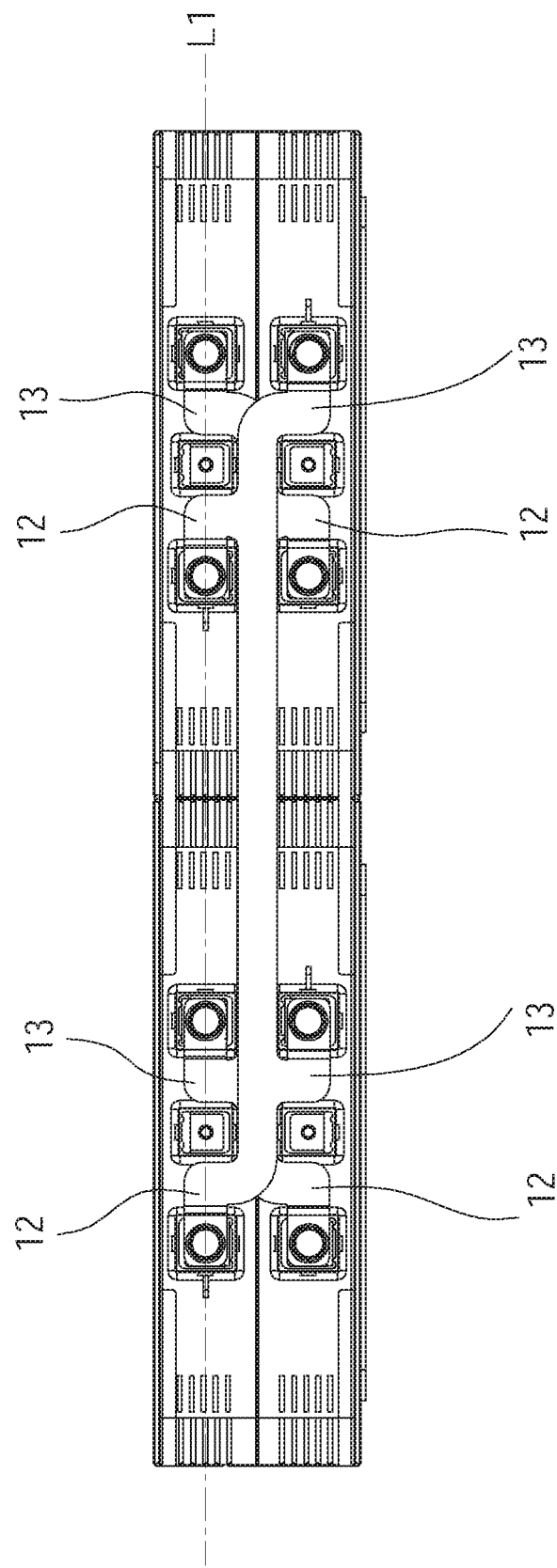
FIG. 5 is a top view of FIG. 4.

Moreover, when the conductive sheets 10 are disposed on the plurality of batteries 1, as shown in FIG. 5, the projection area of the second surface 11d of one of the conductive sheets 10 at least partially overlaps the projection area of the second surface 11d of another conductive sheet 10 in a direction perpendicular to the second surface 11d. Also, the two first conducting portions 12 of one of the conductive sheets 10 and the two second conducting portions 13 of another conductive sheet 10 are substantially on the same straight line L1. Furthermore, the two first conducting portions 12 of one of the conductive sheets 10 and the two second conducting portions 13 of another conductive sheet 10 are alternately arranged.

Figure 4:
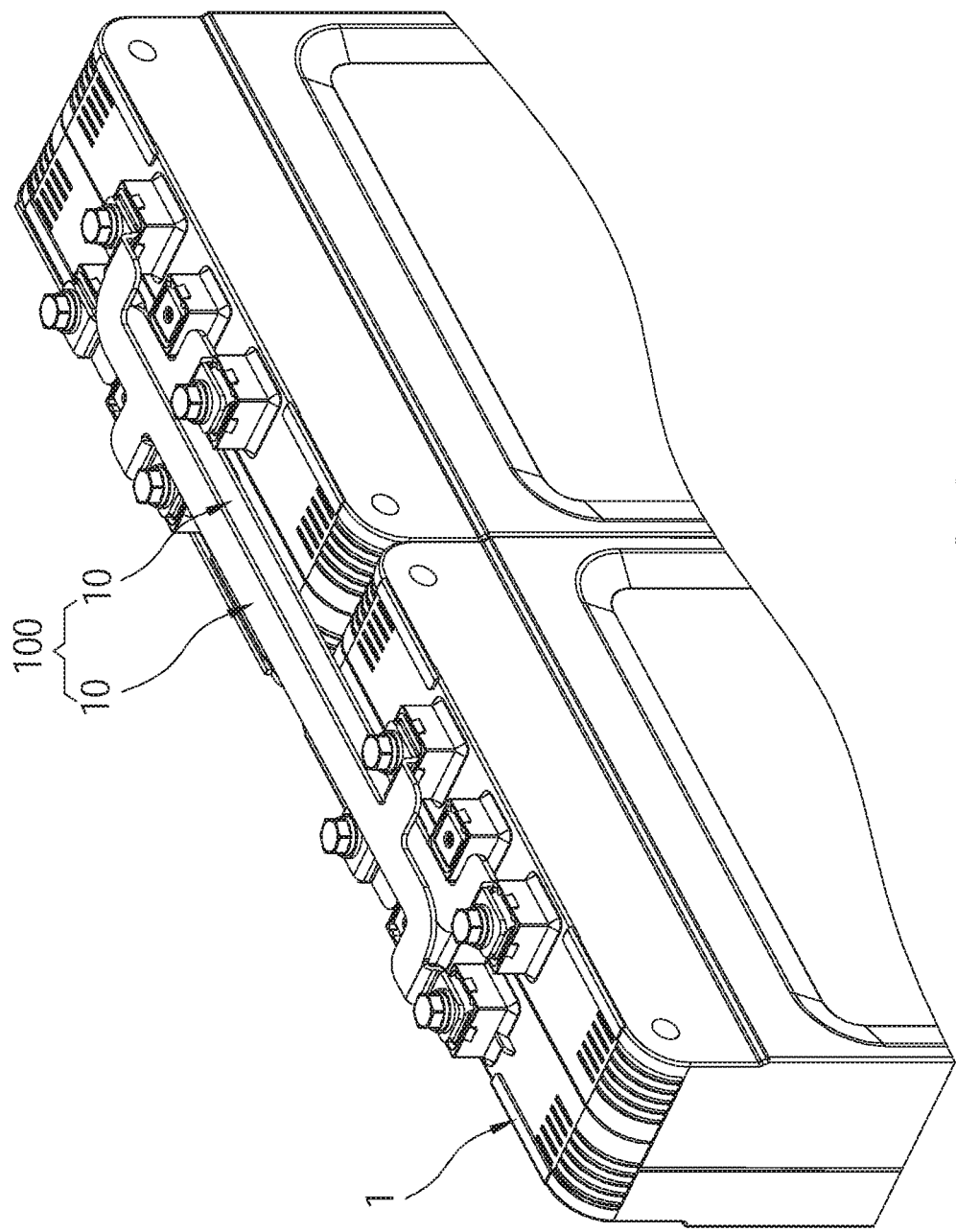
FIG. 4 is a schematic diagram, showing the battery conducting module is disposed on the batteries.

It is worth mentioning that, with the aforementioned design, when the conductive sheets 10 are disposed on the plurality of batteries 1, the two first conducting portions 12 and the two second conducting portions 13 of the conductive sheets 10 are substantially located on the same plane. In this way, when there are plurality of batteries 1 arranged side by side, the battery conducting module 100 could effectively connect the batteries 1 in parallel, and a space occupied by the conductive sheets 10 could be effectively reduced with the cooperative arrangement of the conductive sheets 10. For instance, as shown in FIG. 4, the battery conducting module 100 of the present invention effectively utilizes the space, and is disposed in the gaps between the electrodes of the batteries 1, which could effectively lower the height of the battery pack, enabling the miniaturization of the battery pack.

Figure 8:
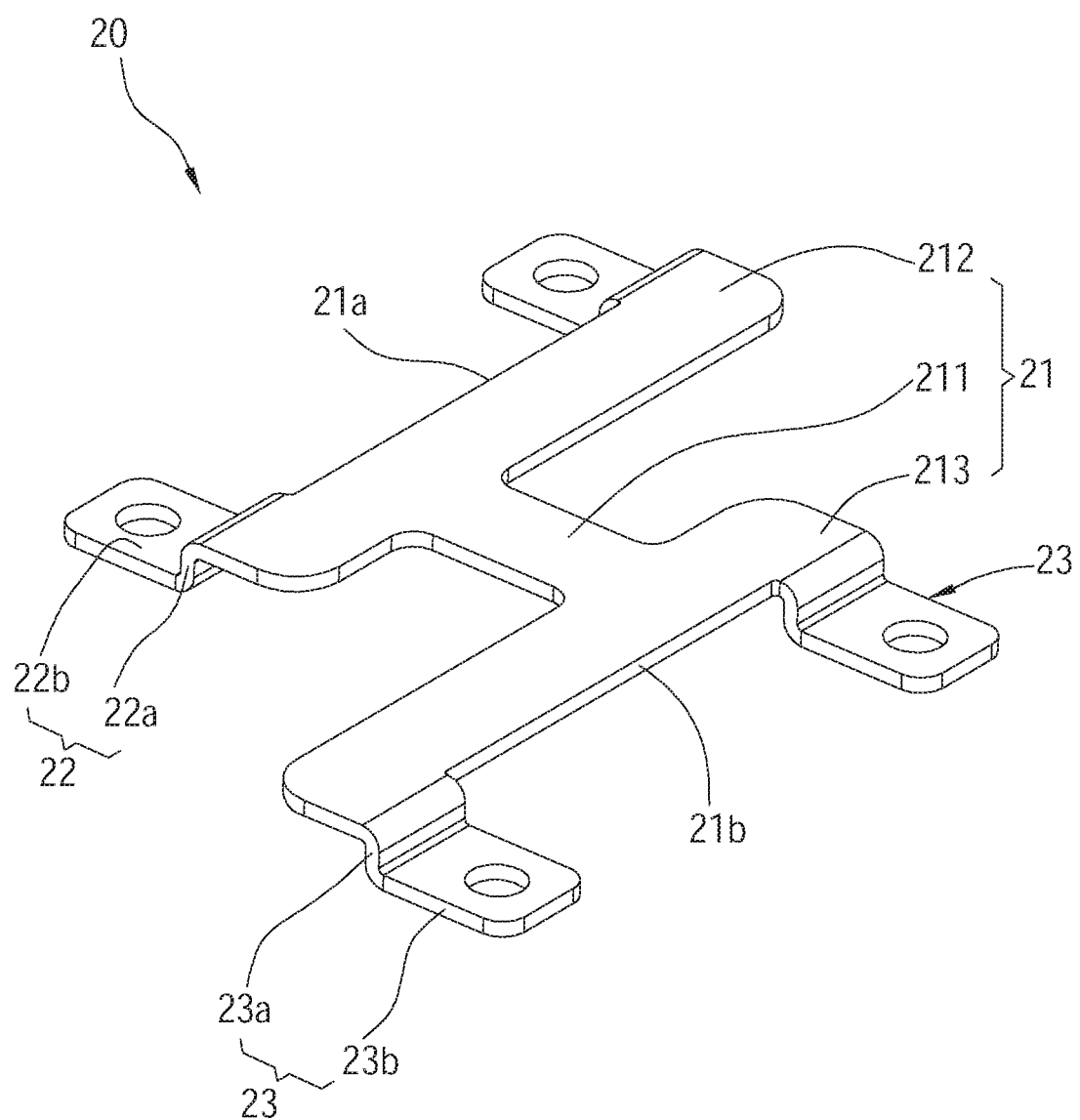
FIG. 8 is a perspective view of the conductive sheet of a second embodiment of the present invention.
Figure 9:
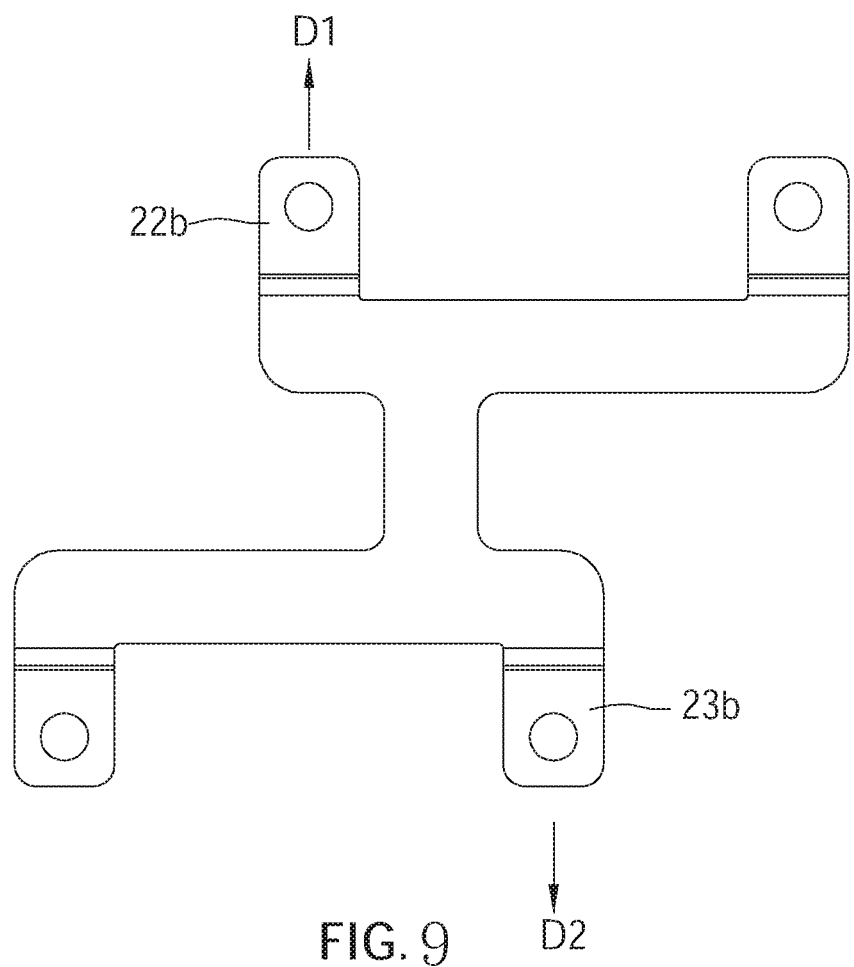
FIG. 9 is a top view of FIG. 8.
Figure 10:
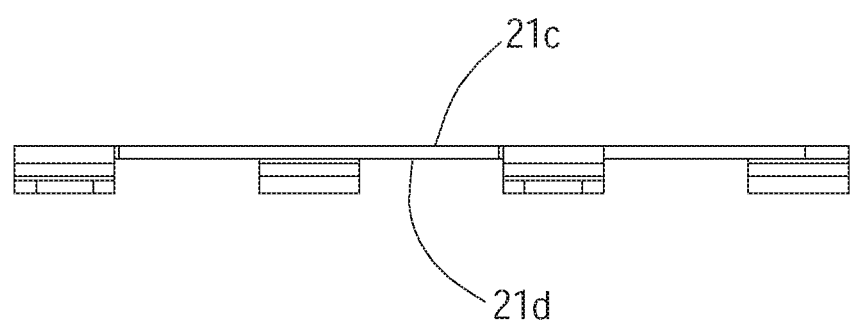
FIG. 10 is a side view of FIG. 8.

A conductive sheet 20 of a second embodiment of the present invention is illustrated in FIG. 8 to FIG. 10 and is made of conductive material, such as gold, silver, copper, aluminum, etc. In the current embodiment, the conductive sheet 20 is made of copper. However, the material of the conductive sheet is not a limitation of the present invention. The conductive sheet 20 includes a connecting portion 21, two first conducting portions 22, and two second conducting portions 23.

The connecting portion 21 has a first side 21a, a second side 21b, a first surface 21c, and a second surface 21d, wherein the first side 21a is opposite to the second side 21b, and the first surface 21c is opposite to the second surface 21d. The first surface 21c and the second surface 21d are disposed between the first side 21a and the second side 21b. In the current embodiment, the connecting portion 21 includes a main portion 211, a first attached portion 212, and a second attached portion 213, wherein the first attached portion 212 and the second attached portion 213 are respectively connected to two ends of the main portion 211. The first attached portion 212 is substantially parallel to the second attached portion 213. The first attached portion 212 has the first side 21a, and the second attached portion 213 has the second side 21b.

The two first conducting portions 22 are spaced apart from each other by a distance and are connected to the first side 21a of the connecting portion 21, wherein both of the two first conducting portions 22 extend toward a first direction D1. Each of the first conducting portions 22 has a first bending section 22a and a first connecting section 22b, wherein the first bending section 22a is connected between the first side 21a of the first attached portion 212 and the first connecting section 22b. The two first connecting sections 22b extend along the first direction D1. In the current embodiment, the two first connecting sections 22b and the connecting portion 21 are respectively located on different planes. More specifically, from the perspective of FIG. 8, the two first connecting sections 22b are located on a plane below the connecting portion 21.

The two second conducting portions 23 are spaced apart from each other by a distance and are connected to the second side 21b of the connecting portion 21, wherein both of the two second conducting portions 23 extend toward a second direction D2 which is opposite to the first direction D1. Each of the second conducting portions 23 has a second bending section 23a and a second connecting section 23b, wherein the second bending section 23a is connected between the second side 21b of the second attached portion 213 and the second connecting section 23b. The two second connecting sections 23b extend along the second direction D2. In the current embodiment, the two second connecting sections 23b and the connecting portion 21 are respectively located on different planes. More specifically, from the perspective of FIG. 8, the two second connecting sections 23b are located on a plane below the connecting portion 21.

FIG. 11 to FIG. 14 are schematic diagrams of a battery conducting module 200 of an embodiment, wherein the battery conducting module 200 is disposed on a plurality of batteries 1 which are disposed side by side. Each of the plurality of batteries 1 has a first electrode 2 and a second electrode 3, wherein the first electrodes 2 and the second electrodes 3 of the plurality of batteries 1 are alternately arranged. In the current embodiment, the first electrodes 2 are negative electrodes and the second electrodes 3 are positive electrodes. However, the first electrodes 2 are not limited to be negative electrodes as exemplified above, but could be positive electrodes, and the second electrodes 3 are not limited to be positive electrodes as exemplified above, but could be negative electrodes.

Figure 13:
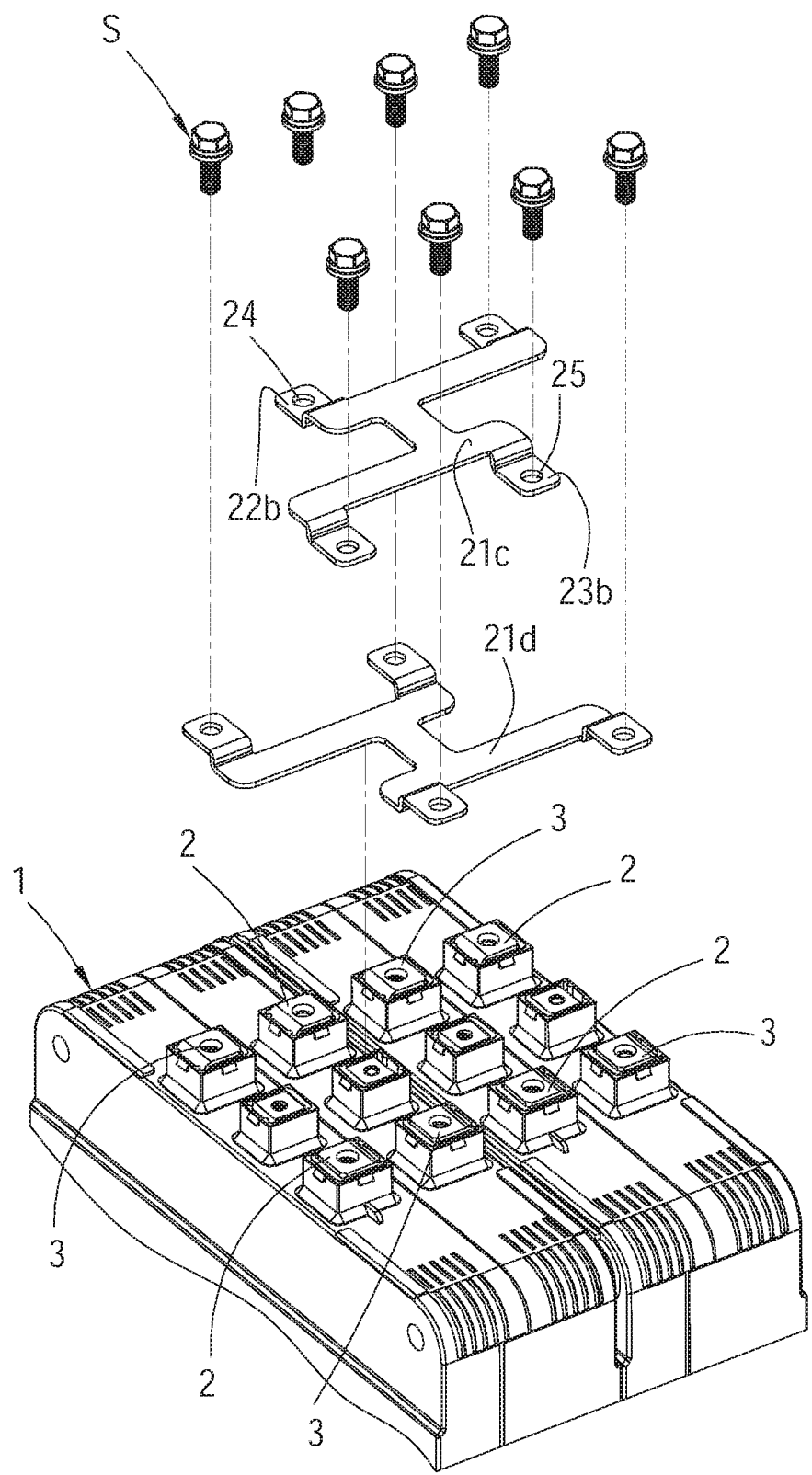
FIG. 13 is an exploded view of FIG. 11.

The battery conducting module 200 includes two conductive sheets 20 of the second embodiment, wherein the two first conducting portions 22 and the two second conducting portions 23 of one of the conductive sheets 20 (e.g. the conductive sheet 10 shown in an upper side of FIG. 13) are adapted to respectively connect the first electrodes 2 of the plurality of batteries 1, and the two first conducting portions 22 and the two second conducting portions 23 of another conductive sheet 20 (e.g. the conductive sheet 10 shown in a lower side of FIG. 13) are adapted to respectively connect the second electrodes 3 of the plurality of batteries 1. As shown in FIG. 13, in the current embodiment, the first connecting section 22b of each of the first conducting portions 22 of the two conductive sheets 20 respectively has a perforation 24, and the second connecting section 23b of each of the second conducting portions 23 of the two conductive sheets 20 respectively has a perforation 25, wherein the perforations 24, 25 are respectively adapted to be passed through by a bolt S, and each of the bolts S is screwed into the first electrodes 2 or the second electrodes 3 of the corresponding battery 1. In this way, the conductive sheets 20 could be firmly and electrically connected to the corresponding first electrodes 2 or the corresponding second electrodes 3. However, in other embodiments, the electrically connecting means between the conductive sheets and the electrodes of the batteries is not limited by the aforementioned design.

Figure 14:
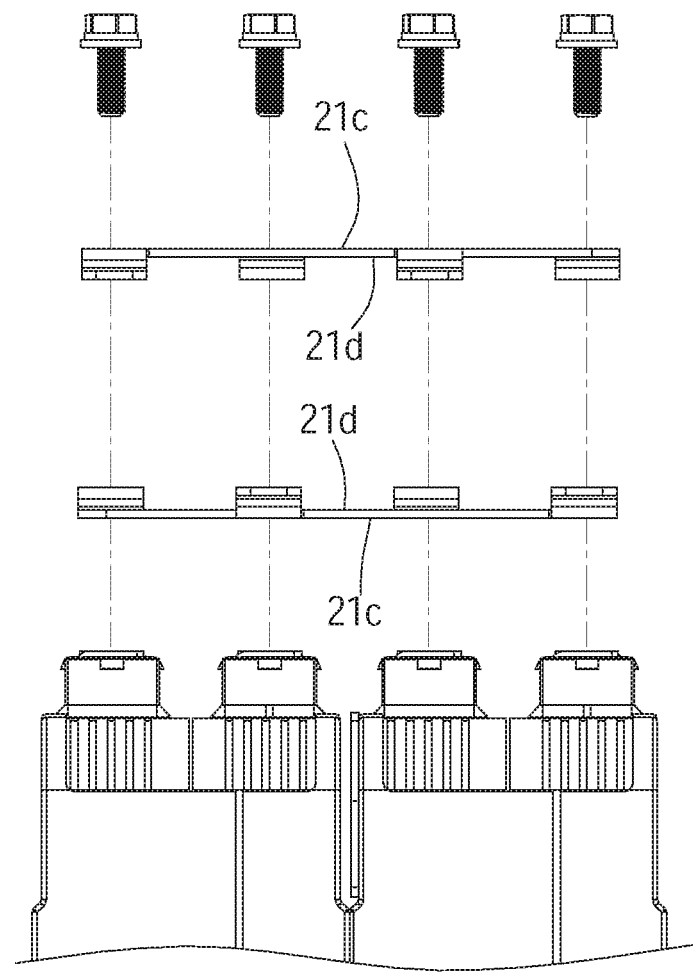
FIG. 14 is a side view of FIG. 13.

It is worth mentioning that, as shown in FIG. 14, when the conductive sheets 20 are disposed on the plurality of batteries 1, the second surface 21*d* of the connecting portion 21 of one of the conductive sheets 20 faces the second surface 21*d* of the connecting portion 21 of another conductive sheet 20. Preferably, the two conductive sheets 20 have an interval left therebetween, without contacting with each other, whereby to be electrically insulated from each other. In addition, in order to prevent a short circuit between the two conductive sheets 20, the connecting portion 21 of each of the conductive sheets 20 could be covered or coated with an insulating coating. However, the insulating coating is not a limitation of the present invention.

Figure 12:
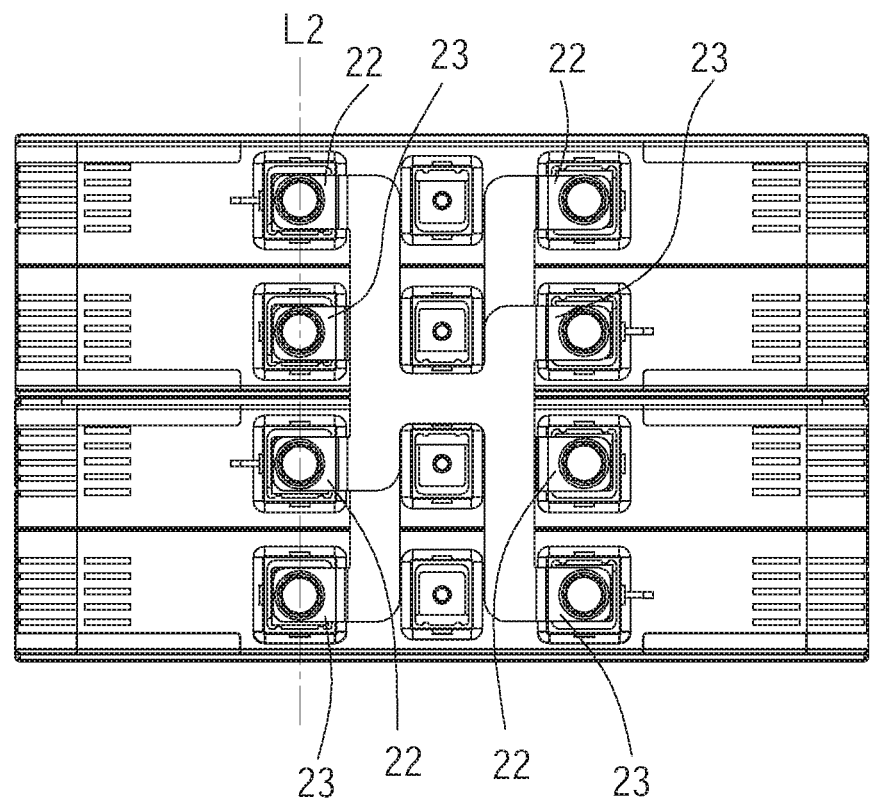
FIG. 12 is a top view of FIG. 11.

Moreover, when the conductive sheets 20 are disposed on the plurality of batteries 1, as shown in FIG. 12, the projection area of the second surface 21*d* of one of the conductive sheets 20 at least partially overlaps the projection area of the second surface 21*d* of another conductive sheet 20 in a direction perpendicular to the second surface 21*d*. Also, the two first conducting portions 22 of one of the conductive sheets 20 and the two second conducting portions 23 of another conductive sheet 20 are substantially on the same straight line L2. Furthermore, the two first conducting portions 22 of one of the conductive sheets 20 and the two second conducting portions 23 of another conductive sheet 20 are alternately arranged.

Figure 11:
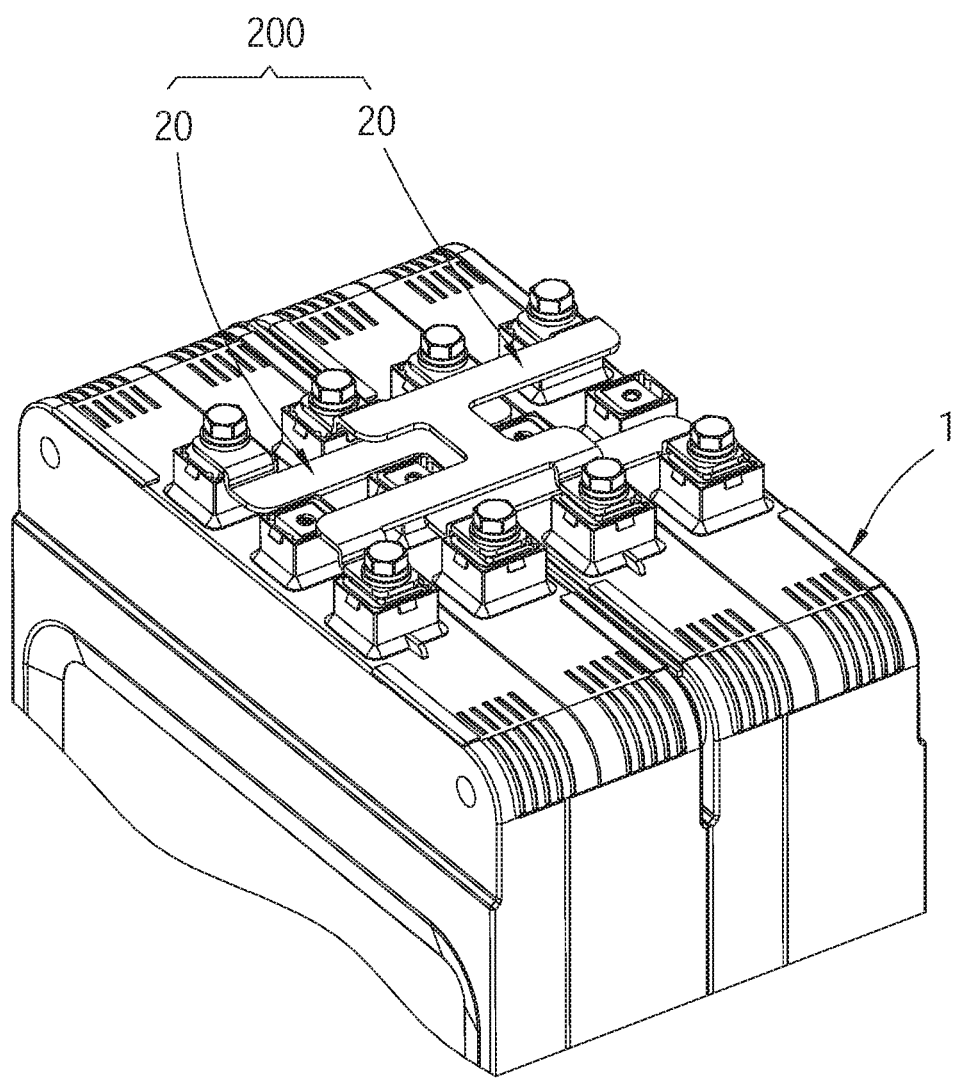
FIG. 11 is a schematic diagram, showing the battery conducting module is disposed on the batteries.

It is worth mentioning that, with the aforementioned design, when the conductive sheets 20 are disposed on the plurality of batteries 1, the two first conducting portions 22 and the two second conducting portions 23 of the conductive sheets 20 are substantially located on the same plane. In this way, when there are plurality of batteries 1 arranged side by side, the battery conducting module 200 could effectively connect the batteries 1 in parallel, and a space occupied by the conductive sheets 20 could be effectively reduced with the cooperative arrangement of the conductive sheets 20. For instance, as shown in FIG. 11, the battery conducting module 200 of the present invention effectively utilizes the space, and is disposed in the gaps between the electrodes of the batteries 1, which could effectively lower the height of the battery pack, enabling the miniaturization of the battery pack.

It must be pointed out that the embodiments described above are only some preferred embodiments of the present invention. Each of the conductive sheets is integrally formed as a monolithic unit from. However, this is not a limitation of the present invention. Also, the number of the first conducting portions and the number of the second conducting portions of each of the conductive sheets are not limited to be two, but could be three or more than three. All equivalent structures which employ the concepts disclosed in this specification and the appended claims should fall within the scope of the present invention.

What is claimed is:

1. A conductive sheet, comprising:
   a connecting portion, having a first side and a second side, which are opposite to each other;
   two first conducting portions, which are spaced from each other by a distance and are connected to the first side of the connecting portion, wherein, both of the two first conducting portions extend along a first direction; and
   two second conducting portions, which are spaced from each other by a distance and are connected to the second side of the connecting portion, wherein, both of the two second conducting portions extend along a second direction;
   wherein the two first conducting portions and the two second conducting portions are arranged in a longitudinal axis direction of the connecting portion in a manner that each of the first conducting portions is non-symmetric with each of the second conducting portions with respect to the longitudinal axis, the first side and the second side of the connecting portion are separated by the longitudinal axis;
   wherein each of the first conducting portions has a first extension section, a first bending section, and a first connecting section; the first extension section is connected to the first side; a side of the first bending section is connected to a side of the first extension section facing the first direction, and another side of the first bending section is connected to the first connecting section; each of the second conducting portions has a second extension section, a second bending section, and a second connecting section, wherein the second extension section is connected to the second side; a side of the second bending section is connected to a side of the second extension section facing the second direction, and another side of the second bending section is connected to the second connecting section.

2. The conductive sheet of claim 1, wherein the first connecting sections and the second connecting sections are substantially located on the same plane; the connecting portion is located on a plane different from the first connecting sections and the second connecting sections.

3. A battery conducting module, which is adapted to connect a plurality of batteries which are arranged side by side, wherein each of the batteries has a first electrode and a second electrode; the first electrodes and the second electrodes of the plurality of batteries are alternately arranged; the battery conducting module comprising:
   two conductive sheets as claimed in claim 1, wherein the two first conducting portions and the two second conducting portions of one of the conductive sheets are adapted to respectively connect the first electrodes of the plurality of batteries, and the two first conducting portions and the two second conducting portions of another conductive sheet are adapted to respectively connect the second electrodes of the plurality of batteries;
   wherein the connecting portion of each of the conductive sheets has a first surface and a second surface which is opposite to the first surface; the first surface and the second surface are disposed between the first side and the second side; the second surface of the connecting portion of one of the conductive sheets faces the second surface of the connecting portion of another conductive sheet.

4. The battery conducting module of claim 3, wherein a projection area of the second surface of one of the conductive sheets at least partially overlaps a projection area of the second surface of another conductive sheet in a direction perpendicular to the second surface.

5. The battery conducting module of claim 3, wherein the two conductive sheets have an interval left therebetween.

6. The battery conducting module of claim 3, wherein the two first conducting portions of one of the conductive sheets and the two second conducting portions of another conductive sheet are substantially on the same straight line.

7. The battery conducting module of claim 3, wherein the two first conducting portions of one of the conductive sheets and the two second conducting portions of another conductive sheet are alternately arranged.

8. The battery conducting module of claim 3, wherein the two first conducting portions and the two second conducting portions of the conductive sheets are substantially located on the same plane.

9. A conductive sheet, comprising:
a connecting portion, having a first side and a second side, which are opposite to each other;
two first conducting portions, which are spaced from each other by a distance and are connected to the first side of the connecting portion, wherein, both of the two first conducting portions extend along a first direction; and
two second conducting portions, which are spaced from each other by a distance and are connected to the second side of the connecting portion, wherein, both of the two second conducting portions extend along a second direction;
wherein the two first conducting portions and the two second conducting portions are arranged in a longitudinal axis direction of the connecting portion in a manner that each of the first conducting portions is non-symmetric with each of the second conducting portions with respect to the longitudinal axis, the first side and the second side of the connecting portion are separated by the longitudinal axis;
wherein the connecting portion comprises a main portion, a first attached portion, and a second attached portion; the first attached portion and the second attached portion are respectively connected to two ends of the main portion; the first attached portion is substantially parallel to the second attached portion; the first attached portion has the first side, and the second attached portion has the second side.

10. The conductive sheet of claim 9, wherein each of the first conducting portions has a first bending section and a first connecting section; each of the first bending sections is connected between the first side of the first attached portion and the first connecting section; each of the second conducting portions has a second bending section and a second connecting section; each of the second bending sections is connected between the second side of the second attached portion and the second connecting section.

11. The conductive sheet of claim 10, wherein the first connecting sections and the second connecting sections are substantially located on the same plane; the connecting portion is located on a plane different from the first connecting sections and the second connecting sections.

* * * * *